Sept. 3, 1940.  F. E. TAYLOR  2,213,774
BOTTLE TRANSFER DEVICE
Filed Sept. 20, 1937  2 Sheets-Sheet 1
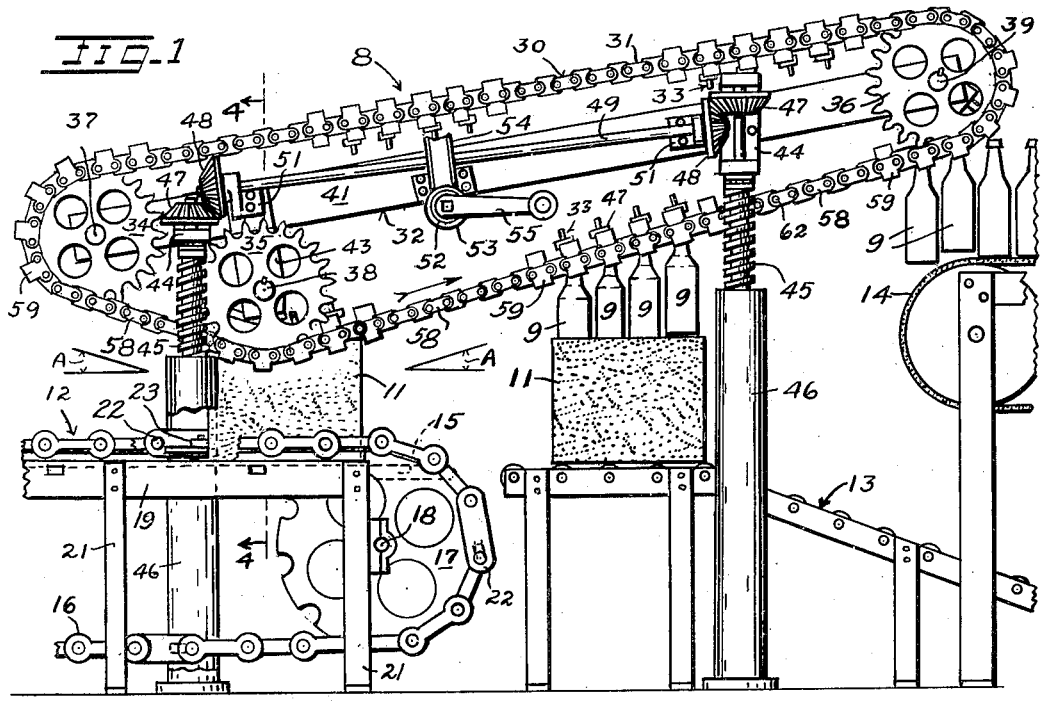
INVENTOR.
FRANK E. TAYLOR
BY Henry N. Young
ATTORNEY Sept. 3, 1940.                F. E. TAYLOR                2,213,774
                        BOTTLE TRANSFER DEVICE
                    Filed Sept. 20, 1937         2 Sheets-Sheet 2
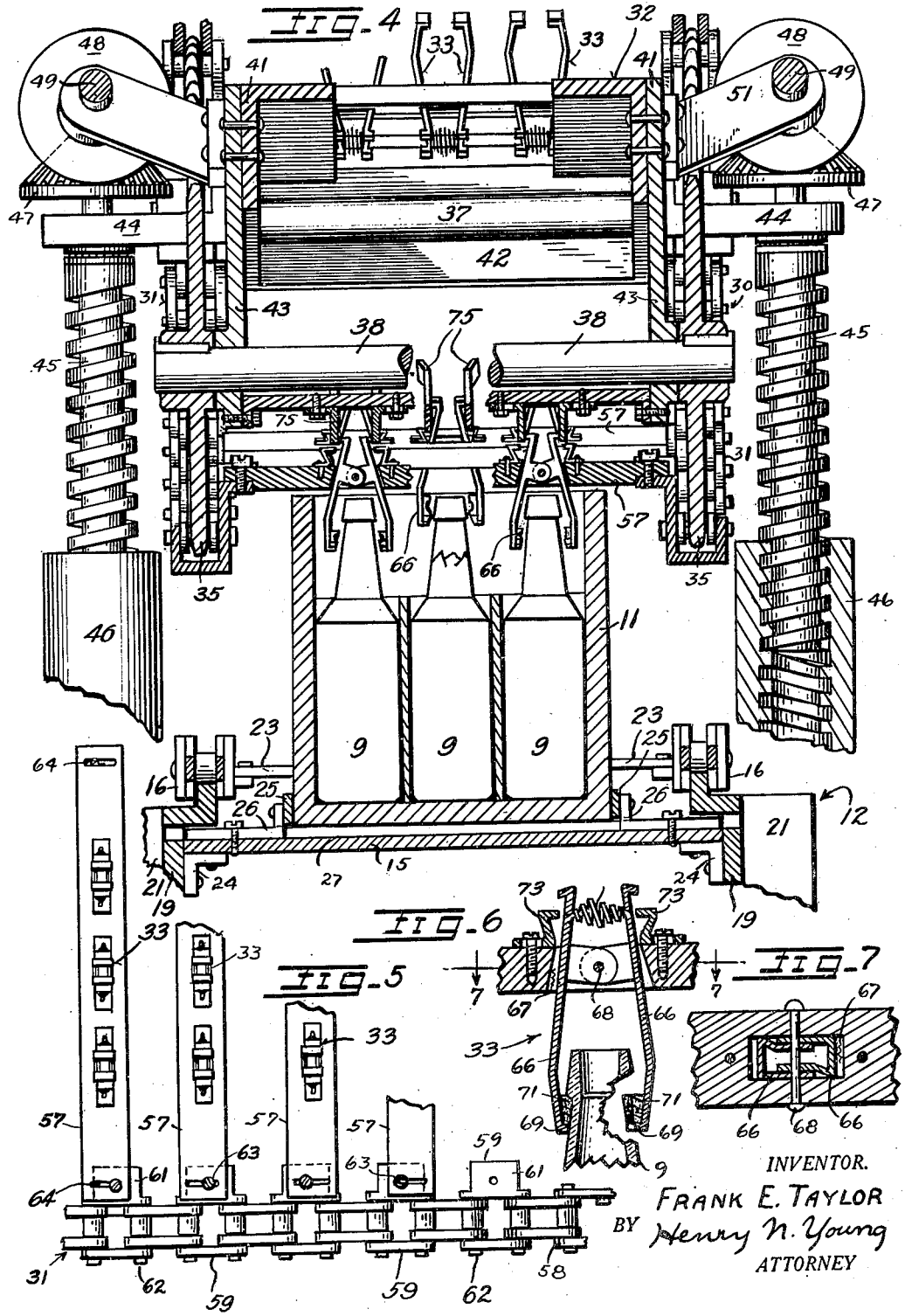
INVENTOR.
FRANK E. TAYLOR
BY Henry N. Young
ATTORNEY Patented Sept. 3, 1940

2,213,774

UNITED STATES PATENT OFFICE 2,213,774

BOTTLE TRANSFER DEVICE

Frank E. Taylor, Oakland, Calif.

Application September 20, 1937, Serial No. 164,643

6 Claims. (Cl. 198—20)

The invention relates to a continuously operable device for removing bottles from open cases thereof.

An object of the invention is to provide a particularly effective device for removing bottles from cases having sides which extend above the contained bottles.

Another object is to provide an improved bottle transfer device having batteries of bottle-gripping tongs arranged to engage and remove the bottles from successive cases as the cases are moved in a straight line at a uniform speed.

A further object is to provide for adjustment of the apparatus to handle bottles which are of different heights and/or are differently spaced in the cases which contain them.

The invention possesses other objects and features of advantage, some of which, with the foregoing, will be set forth or be apparent in the following description of a typical embodiment thereof, and in the accompanying drawings in which, Figure 1 is a side elevation of a bottle transfer unit embodying the features of present invention and associated with conveyors for the bottle cases and the bottles therefrom.

Figures 2 and 3 are enlarged fragmentary vertical sectional views taken respectively at bottle-gripping and bottle-releasing parts of the transfer unit.

Figure 4 is an enlarged fragmentary vertical section at 4—4 in Figure 1.

Figure 5 is an enlarged fragmentary and inside view of a chain conveyor of the unit.

Figure 6 is an enlarged fragmentary section on the line 6—6 in Figure 2 and showing a bottle-gripping tong of the structure.

Figure 7 is a section at 7—7 in Figure 6.

As is particularly illustrated, the features of present invention are incorporated in the structure of a bottle transfer unit 8 which is arranged to remove bottles 9 from cases 11 moving on a conveyor 12 and a rollway 13, and deposit the removed bottles on a conveyor 14. The conveyor 12 may comprise any suitable arrangement which positively moves filled cases 11 forwardly in a straight line and in equally spaced relation beneath the transfer unit 8. As shown in Figures 1 and 4, the conveyor 12 is arranged to move the cases 11 forwardly over an horizontally disposed slide plate 15 and to deliver each case 11 upon an horizontal portion of the rollway 13 after the bottles in the case have been engaged by a bottle-gripping means of the unit 8. When the bottles have been removed from engagement with a case, the emptied case is delivered upon a sloping portion of the rollway 13 for gravity removal. The bottles are arranged in orderly lines and rows in the cases in a usual manner, and may be spaced by separator partitions 10.

The disclosed means for moving the cases 11 forwardly over the slide plate 15 comprises like sprocket chains 16 disposed at opposite sides of the plate and mounted on like sprocket wheels 17 fixed near the opposite ends of shafts 18 which are journalled on a frame structure which supports the plate 15; while only one shaft 18 with its sprockets 17 is shown, it will be understood that the chains 16 are continuous and extend around at least one other shaft and sprocket-wheel assembly such as that shown. Side frame members 19 are supported on posts 21 and provide tracks for supporting the upper chain portions between the sprockets which they engage, and mutually opposed link plates 22 of the chains carry push bars 23 between them for engaging behind a case 11 on the plate 15 for advancing the case as the chains are moved together, one sprocket shaft being suitably and continuously driven. The conveyor 14 is of a usual belt type having its bottle-supporting portion horizonal so that bottles delivered thereon from the unit 8 may be carried away in erect position on the belt.

Brackets 24 support the slide plate 15 on and between the side members 19 at opposite sides of the plate. Guide rails 25 are mounted over and along the slide plate for guiding successive cases 11 in a predetermined line of movement longitudinally along the plate, it being noted that said plate extends beyond the chain at the forward sprockets 17. As particularly illustrated, the guide rails 25 are carried on support members 26 having their bases adjustably fixed in complementary slots 27 provided in and across the plate 15 whereby the guideway provided between the guide rails 25 may be adjusted to receive bottle cases 11 of a particular width.

It will now be noted that the conveyors 12 and 14 are in general alignment, and that the transfer unit 8 is disposed above and between them in their line for transferring bottles 9 from a case 11 to the conveyor belt 14. Said unit essentially comprises a continuous chain conveyor 30 carried on sprockets mounted on a frame 32 and providing sets of bottle-gripping tongs 33 arranged in banks, said banks of tongs 33 being equally spaced along the chain conveyor. As shown, the conveyor 30 comprises a pair of laterally spaced sprocket chains 31 each engaging sprocket wheels 34 and 35 and 36, corresponding said wheels being respectively fixed on mutually parallel shafts 37 and 38 and 39 journalled in the frame 32. Said frame comprises an upper rectangular portion of rigid structure having side members 41 connected by end members 42, and having hanger arms 43 fixedly depending from the sides 41 and carrying the sprocket shaft 38; the shafts 37 and 39 are journalled at opposite ends of the upper frame portion, and the chains 31 are operative in mutually parallel planes laterally of the frame 32 and perpendicular to the plane of the upper frame portion provided by the members 41 and 42.

For a reason to be hereinafter brought out, the frame 32 is so mounted and disposed that it is vertically adjustable and has the different conveyor portions which respectively extend between the sprockets 34 and 35 and between the sprockets 35 and 36 making like angles A with the line of movement of the cases on the conveyor 12. Bracket arms 44 are provided at spaced points of the side frame members 41 to extend laterally beyond the frame, and have mutually parallel jack shafts 45 swivelled therein in upright position. The shafts 45 are threaded below their swivel points and engage complementarily threaded bores provided in support posts 46 for adjustably supporting the transfer unit in place for its operation.

For effecting their simultaneous rotation to adjust the disposal of the unit 8, the shafts 45 carry bevel gears 47, and the gears 47 at each side of the unit engage complementary bevel gears 48 which are mounted at the extremities of a shaft 49 which is journalled in brackets 51 mounted on the adjacent frame member 41. As is particularly indicated in Figure 1, a shaft 52 is journalled on the frame 32 to extend thereacross, and is provided with worm members 53 which constantly engage worm gears 54 fixed on the different shafts 49. A hand crank 55 is mounted on a protruding end of the shaft 52 for effecting the rotation thereof, it being understood that a rotation of the shaft 52 in either possible direction is arranged to adjust the height of the unit 8 without changing its angular relation to the horizontal.

It will now be noted that the bottle-gripping tongs 33 are mounted on support bars 57 which are carried by and between corresponding links of the sprocket-mounted conveyor chains 31. At those chain points at which bars 57 are to be attached, the usual pair of outer link plates 58 is replaced by a member 59 which is U-shaped in cross-section and provides an ear 61 extending toward the other chain, it being understood that the sides of the member 59 are perforated for receiving the chain pins 62 in the same manner and spacing as the link plates which they replace. Screws 63 extend through slots 64 which are provided in and across the end portions of the bars 57 and into threaded engagement with the ears 61 for fixing the bar ends to the members 59 and so to the chains of which the members are parts. In this manner, any number and arrangement of bars 57 may be mounted on and between the chains 31, and the mounted bars of a bank thereof may be adjustably spaced longitudinally of the conveyor assembly.

For purposes of illustration, the unit 8 is shown as particularly arranged for removing bottles 9 from cases 11 which contain twelve bottles in an orderly arrangement which is four bottles long and three bottles wide, and the present tong-carrying bars 57 are accordingly each provided with three tong assemblies 33 appropriately spaced along the bar for simultaneously engaging the bottles of a row across the case. The tongs 33 are so constituted and disposed that they permit some slight variation of bottle spacing in the rows, such variation arising from differences in bottle diameters and/or the thickness of the separators 10 between the bottles. Four bars 57 connecting a succession of alternate links of the chains 31 provide a battery of twelve tongs for handling bottles from the twelve-bottle case 11 which is shown.

Referring to the disclosed tong structure, the tongs 33 are seen to each comprise a pair of similar members 66 which extend through an opening 67 in the bar 57, and are pivotally mounted on a common pivot pin 68 mounted in the bar 57 and extending across the opening 67 whereby the pivotal axis for the members 66 is longitudinal of and parallel to the link members 59 which carry the bar. Clamp jaws 69 are provided at the extremities of the tong members 66 which extend at the outer sides of the bars 57 and preferably carry more or less soft gripping elements 71 for cooperative frictional contact with the bottle necks below the usual shoulder provided adjacent the pouring lip of the bottle.

A suitable spring means is cooperative between the members 66 for urging a bottle gripping disposal of the jaws 69; as shown, a compression spring 72 is operative between the inner portions of the members 66 for the purpose. Means are preferably provided for limiting the movement of the jaws 69 toward each other, said means comprising stop members 73 adjustably mounted on the bar 57 and operative against and between mutually opposed inner portions of the members 66 to suitably limit a closing of the tong jaws when no bottle neck is disposed between them. The generally Z-shaped stops 73 are preferably shaped of spring material whereby mechanical shock may be minimized when the released members 66 engage them by reason of the action of the spring 72.

Referring now to the cycle of operations of the unit 8 to effect the transfer of a set of bottles 9 from a case 11 to the conveyor belt 14, it will be noted that the bottles are arranged to be gripped and carried by a corresponding set or bank of tongs 33 only while the tongs travel in straight and upwardly inclined lines between the sprockets 35 and 36. As a tong carrying a bottle approaches the end of its operative travel, its inner arms are wedgedly engaged and forced toward each other to open the tongs and release the bottle by their engagement with wedge plates 74 which are mounted on the frame 32 adjacent the sprocket shaft 39. After the bottle is released, the tong moves out of engagement with the plates 74 whereby it may close to the limit permitted by the stops 73. The tong remains fully closed until the bar 57 which carries it is moving between the sprockets 34 and 35, at which time the inner tong extremities engage wedge plates 75 which are operative to open the tongs for freely spanning the bottle necks as the tong moves in its forwardly descending line toward the bottle to be gripped. As the tong starts movement in its ascending line of motion, it is moved out of engagement with the wedge plates 75 for its release to grip the bottle neck which is then disposed between its jaws.

As particularly shown, the wedge members 74 are independently mounted on a plate 76 fixed to and between the frame sides 41, said members being adjustable in their mounting so that they will properly engage the tong members 66 for opening the tong to release the bottle at the proper time. The wedge members 75 are independently mounted on a plate 77 fixed to and between the lower extremities of the frame extensions 43 which carry the shaft 38, and are adjustable in their mounting so that the opened tongs may freely receive the top of the bottle neck to be engaged. It will be understood that the adjustment of the members 75 of a bar 57 may provide for the reception and gripping of rows of bottles having slightly different spacings in their rows.

The conveyors 12 and 30 are arranged to be driven at fixed relative speeds such that the component of the speed of the article-carrying portion of the conveyor 30 in a line parallel to the feeding line of the conveyor 12 is equal to the speed of feeding in the latter line. Also, the horizontal spacing of the tongs 33 is equal to the spacing of bottles in the case 11 whereby the bottles of a set hanging vertically from a bank of tongs 33 are mutually spaced as they were in the case from which they were extracted; it is for meeting this requirement that the tong-supporting bars 57 are adjustably mounted on the chains in the described manner. It will be understood that the case-pushing bars 23 of the conveyor 12 must be so set that a case will be so moved thereby beneath a set of bars 57 as to provide for the engagement and removal of all of the bottles from the case, the rows of bottles being successively gripped by the tongs of successive bars 57. Preferably, and as shown, the outer tong portions are so shaped as to provide a horizontal engagement of their jaws with a bottle neck.

It will now be particularly noted that the arrangement providing an angular approach and angular recession of the tongs with respect to a case 11 while introducing the open tongs into the open case from above and upwardly removing the bottles from the case may effect a change in the mutual spacing of the tong jaws of successive rows of tongs as the tong bars 57 change from one line of movement to the other as the chains 31 pass around the sprockets 35, particularly if the tong jaws are spaced from a longitudinal conveyor line which intersects the lines connecting the centers of corresponding links of the chains 31, said longitudinal line being hereinafter referred to as the line of travel of the conveyor 30. For minimizing the aforesaid spreading of the tongs, the tops of the bottle-engaging jaw members preferably lie in or adjacent the central plane of the links which carry them, this being the relation shown in the drawings. The arrangement is particularly important for the removal of bottles from cases such as the present wherein the side casing walls rise above the contained bottles to permit a stacking of filled cases one upon the other; without such an arrangement, the jaws of a set of tongs could not both enter and lease a case 11.

Except for the slight angular spreading movement of the tong jaws as the conveyor chains 31 move in short arcs around the sprockets 35, the movement of the tongs is entirely transverse to the plane of movement of the case as the tongs and case are advanced in synchronism. The arrangement is also advantageous in that the jaws are rising along the bottle necks when they are rendered operative, the relation being clearly brought out in Figure 2. It will be understood that the gripped bottles of a set in the case will pull the case forwardly with them and over the horizontal portion of the rollway 13 until the bottles are drawn free of at least the case partitions 10.

The present unit may be readily adapted for removing bottles from a case containing twenty-four bottles in six cross-rows of four each; it is merely necessary to replace the four bars 57 having three tongs 33 with six bars having four tongs, six chain link members 59 being provided at each tong bank location for this purpose. Also, the use of other forms and types of article-gripping devices in lieu of the specific tongs 33 may be resorted to for handling containers of different shape, it being noted, for example, that the containers might be cans having their tops open whereby tongs would be provided for operation against and inside one can or for simultaneously gripping a plurality of adjacent cans.

It will be obvious that certain features of the present apparatus are directly applicable and/or adaptable for use in apparatus for placing bottles, or other containers, in cases. Thus, as one example, if the action were reversed by reversing the disclosed conveyors, the present arrangement for inserting the tongs in a deep case without contacting the case sides would be of value.

From the foregoing description taken in connection with the accompanying drawings, the advantages of present device will be readily understood by those skilled in the art to which the invention appertains. While I have described the features and principles of operation of a structure which I now consider to be a preferred embodiment of my invention, I desire to have it understood that the showing is primarily illustrative, and that such changes may be made, when desired, as fall within the scope of the following claims.

I claim:

1. In combination with a horizontal conveyor for effecting a continuous and rectilinear feeding movement of like cases having open tops and containing articles to be transferred, a transfer unit including a continuous conveyor having successive portions thereof sloping downwardly and upwardly with respect to a low point thereof above the path of feeding of the feeding conveyor, and gripping tongs carried by the transfer conveyor and arranged to supportingly engage a said article in a case on the first conveyor when the tongs are substantially at the aforesaid low point of the conveyor, the article-gripping jaws of said tongs lying substantially in the line of travel of the second conveyor whereby said jaws are arranged to travel solely vertical with respect to the case as they approach and leave the aforesaid point.

2. In combination with a horizontal conveyor for effecting a continuous and rectilinear feeding movement of like cases having open tops and containing an orderly array of articles to be transferred, a transfer unit including a continuous conveyor having successive portions thereof sloping downwardly and upwardly with respect to a low point thereof above the path of feeding of the feeding conveyor, and sets of article grippers carried by the transfer conveyor for engaging the articles in successive cases when the articles and grippers are disposed adjacent and beyond the aforesaid point of the transfer conveyor.

3. A structure in accordance with claim 2 having adjustable means to adjust the relative spacing of the gripper of the sets thereof for conformity with the relative spacing of the arrays of articles in the cases.

4. In combination with a substantially horizontal conveyor for effecting a continuous and rectilinear feeding movement of a succession of articles thereon toward a fixed and predetermined point in a fixed path, a transfer unit including a continuous conveyor movable in a fixed path overlying the line of the first path and having successive portions thereof sloping downwardly and upwardly with respect to a fixed point opposite the first said point and making equal angles with the feeding path of the first conveyors, and an article-gripping means carried by the transfer conveyor and operative substantially in the line of travel thereof to supportingly engage an article on the first conveyor when said means are substantially at the aforesaid low point of the conveyor.

5. In combination with a horizontal conveyor for effecting a continuous and rectilinear feeding movement of articles thereon to be transferred, a transfer unit including a continuous conveyor having successive portions thereof sloping downwardly and upwardly with respect to a low point thereof above the path of feeding of the feeding conveyor, and an article support carried by the transfer conveyor and arranged to supportingly engage a said article on the first conveyor when the support is substantially at the aforesaid low point of the conveyor, the article-gripping means of said support lying substantially in the line of travel of the second conveyor whereby said means are arranged to travel solely vertical with respect to the first conveyor as they approach and leave the aforesaid point.

6. In a device for removing articles from a support surface on which they gravitally rest in a line thereof, a frame, a continuous conveyor carried by the frame and actuatable longitudinally thereof in a fixed path relative to the frame and overlying said support surface and having successive portions thereof sloping downwardly and upwardly with respect to a low point which lies in the line of travel of the conveyor, means for relatively moving said frame and surface to successively dispose corresponding points of the said articles at the said conveyor point, an article-supporting means carried by said conveyor and operative at the said point thereof to supportingly engage a said article thereat to thereafter support the article from the upwardly sloping conveyor portion, and means for actuating said conveyor at such a speed and in such a direction that no relative movement of the support surface and the upwardly sloping conveyor portion occurs in the direction of relative movement of the surface and frame.

FRANK E. TAYLOR.